US 9,344,872 B2

(12) United States Patent
Pandey et al.

(10) Patent No.: US 9,344,872 B2
(45) Date of Patent: May 17, 2016

(54) METHOD AND APPARATUS FOR PROPAGATING PUBLIC SAFETY MULTICAST AND BROADCAST SERVICES AMONG PUBLIC SAFETY PERSONNEL

(71) Applicant: MOTOROLA SOLUTIONS, INC, Schaumburg, IL (US)

(72) Inventors: Aparna Pandey, Chicago, IL (US); Tyrone D. Bekiares, Park Ridge, IL (US); Harish Bhandiwad, Schaumburg, IL (US); Randy L. Ekl, Lake Zurich, IL (US); Steven D. Tine, Buffalo Grove, IL (US); Ryan P Ziolko, Schaumburg, IL (US)

(73) Assignee: MOTOROLA SOLUTIONS, INC., Schaumburg, IL (US)

( * ) Notice: Subject to any disclaimer, the term of this patent is extended or adjusted under 35 U.S.C. 154(b) by 0 days.

(21) Appl. No.: 14/692,403

(22) Filed: Apr. 21, 2015

(65) Prior Publication Data

US 2015/0230073 A1  Aug. 13, 2015

Related U.S. Application Data

(62) Division of application No. 13/794,967, filed on Mar. 12, 2013, now Pat. No. 9,036,635.

(51) Int. Cl.
*H04W 4/00* (2009.01)
*H04W 4/22* (2009.01)
*H04W 4/06* (2009.01)
(Continued)

(52) U.S. Cl.
CPC ............... *H04W 4/22* (2013.01); *G08B 25/08* (2013.01); *G08B 27/001* (2013.01); *H04L 12/1895* (2013.01); *H04L 67/104* (2013.01); *H04L 67/18* (2013.01); *H04L 67/2842* (2013.01);
(Continued)

(58) Field of Classification Search
None
See application file for complete search history.

(56) References Cited

U.S. PATENT DOCUMENTS 7,783,777 B1   8/2010   Pabla
7,860,948 B2   12/2010  Hundscheidt
(Continued)

FOREIGN PATENT DOCUMENTS

EP   1612992 B1   6/2010
WO   03069507 A1   1/2003
(Continued)

OTHER PUBLICATIONS

Corresponding International Application No. PCT/US2014/020102—International Search Report with Written Opinion dated Aug. 10, 2014.

*Primary Examiner* — Michael J Moore, Jr.

(57) ABSTRACT

Public safety user equipment (PS UE) that establishes a first wireless communication channel over a primary network to at least one multimedia multicast or broadcast service management entity and establishes one or more alternative wireless communication channels over one or more alternative networks (310). The public safety user equipment receives at least one multimedia multicast or broadcast service message over the first wireless communication channel (320). Then, the PS UE extracts data contained in the multimedia multicast or broadcast service message and storing the data in a local cache (330). The PS UE receives a cache request from the one or more user equipment over one or more alternative wireless communication channels (340) and then the PS UE transmits the stored data to the one or more PS user equipment (350).

14 Claims, 6 Drawing Sheets

(51) Int. Cl.
*H04L 12/18* (2006.01)
*H04L 29/08* (2006.01)
*G08B 25/08* (2006.01)
*H04W 72/00* (2009.01)
*H04W 76/00* (2009.01)
*G08B 27/00* (2006.01)

(52) U.S. Cl.
CPC ............. *H04W 4/06* (2013.01); *H04W 72/005* (2013.01); *H04W 76/007* (2013.01)

(56) References Cited

U.S. PATENT DOCUMENTS

| | | | |
|---|---|---|---|
| 8,108,623 B2 | 1/2012 | Krishnaprasad | |
| 8,233,435 B2 | 7/2012 | Cordeiro | |
| 2008/0120639 A1* | 5/2008 | Walter | G08B 27/005 725/33 |
| 2010/0008290 A1 | 1/2010 | Fischer | |
| 2011/0058490 A1 | 3/2011 | Mills | |
| 2012/0126976 A1 | 5/2012 | Bugenhagen | |
| 2012/0179421 A1* | 7/2012 | Dasgupta | G05B 23/0281 702/181 |
| 2013/0083717 A1* | 4/2013 | Vos | H04W 4/06 370/312 |
| 2014/0141806 A1* | 5/2014 | Phulari | H04W 4/22 455/456.3 |

FOREIGN PATENT DOCUMENTS

| | | |
|---|---|---|
| WO | 2004100493 | 11/2004 |
| WO | 2011116819 A1 | 3/2010 |

\* cited by examiner

METHOD AND APPARATUS FOR PROPAGATING PUBLIC SAFETY MULTICAST AND BROADCAST SERVICES AMONG PUBLIC SAFETY PERSONNEL

CROSS-REFERENCE TO RELATED APPLICATION

The present application is a divisional application of, and claims priority to, U.S. patent application Ser. No. 13/794,967, filed in the United States Patent Office on Mar. 12, 2013, the entire contents of which are incorporated herein by reference.

FIELD OF THE DISCLOSURE

The example and non-limiting embodiments of this invention relate generally to wireless communication systems, methods, devices and specially programmed computer devices and tangible storage media, and, more specifically, relate to propagating public safety multicast and broadcast services among wireless communication devices distributed in one or more wireless communication systems.

BACKGROUND

Advanced mobile broadband services are now available to public safety personnel by way of private and public safety (PS) long term evolution (LTE) networks and LTE enabled user equipment (UE). For example, the Third Generation Partnership Project (3GPP) introduced multimedia broadcast/multicast services (MBMS) as part of LTE in Release 9 and has continued to support this functionality in subsequent releases, such as Release 10 (LTE-Advanced). It is contemplated that future releases of LTE also will support this functionality (LTE-Beyond). Moreover, MBMS is positioned to be an important component of the nationwide public safety broadband network being created in the United States called FirstNet Nationwide Network. MBMS is a point-to-multipoint interface which is capable of delivering multicast and broadcast services within a specific cell, or across multiple cells, by way of a single-frequency network configuration. MBMS does not provide content services by itself, but instead various applications can use MBMS' bearer capabilities to create user services.

According to 3GPP TS 22.246, there are four types of MBMS user services available to enable public safety applications; streaming services, file download services, carousel services and television services. The first MBMS user service, streaming services provides a continuous data flow providing a stream of continuous media (e.g., audio and video) which the specification defines as a basic MBMS user service. In addition, supplementary information of text and/or still images (static media) can be delivered along with an audio/video stream. For example, supplementary information such as a uniform resource locator can be included in the text or embedded in a still image, thereby allowing the user to optionally access the content over the Internet. Another example of supplementary information provided in streaming services is the use of static still images as banner images that advertise some product or service. In either example, the static media needs to be synchronized and displayed with the audio/video streams.

The second user service enabled by MBMS, file download services includes delivering binary data (e.g., file data) over an MBMS bearer. Such a user service enables a MBMS-enabled user equipment to activate an appropriate application in response to receiving the delivered binary data. File download services are required to be reliable, such that the user equipment must receive all the sent data in the proper order to experience this user service.

The third MBMS user service is carousel service which combines aspects of both streaming and file download services as described above. Similar to the streaming service, this service includes time synchronization. However, the target media of this service is only static media (e.g., text and/or still images). Time synchronization with other media also is required. For example, text objects are delivered and updated from time to time. Still images also may be collated to display low frame-rate video. Like the file download service, this user service also provides reliability however, typically 100% reliability is not always necessary. One of the benefits of carousel services is that it is can be provided over a low bit-rate bearer.

A fourth MBMS user service is television service consisting of synchronized streaming audio and visual components. Ideally, given LTE bandwidth constraints, television service will support short-duration broadcast streams, such as short television network headline news briefings.

It is envisioned that providing MBMS user service to private or public safety LTE networks such as FirstNet can enhance various public safety broadcast alerts such as: an America's missing broadcasting emergency response (AMBER) alert, a child abduction emergency (CAE) alert, a child is missing (ACIM) alert, and a Silver Alert (e.g., public notification of missing seniors, typically with Alzheimer's Disease, dementia, or other mental disabilities). Other public safety applications which can be enhanced by MBMS user service include providing real-time or near real-time data pertaining to various law enforcement search and investigatory activities. For example, a be-on-the-lookout (BOLO) broadcast could be enhanced to provide up-to-the-minute information to let all public safety personnel have the same operational view, whether they are on opposite sides of a building, or on the other side of town, in another county, or across state lines. In other words, providing public safety personnel with the same street-level data could result in the more expeditious apprehension of criminals. It also could help avoid the possible waste of law enforcement resources in the event that the individual(s) subject to the BOLO are already in custody.

Although it is envisioned that private and public safety (PS) LTE coverage will envelope most major metropolitan areas in world (as well as most major cities in the United States by way of FirstNet), it may not become ubiquitous. As such, not all LTE-enabled UE will maintain continuous private or PS LTE coverage (e.g., the user equipment may be operating in an out of service area, or the user equipment may be turned off at the end of the public safety employee's shift). Moreover, some public safety personnel may not have broadband devices that support MBMS. In other words, conventional broadband routing algorithms will not be sufficient to provide public safety personnel that missed a MBMS service broadcast with the relevant missed MBMS information. As such, up-to-the-minute information will not optionally be propagated to all public safety personnel by way of MBMS user services.

Accordingly, there is a need for an efficient method, apparatus and computer programs to that propagate public safety MBMS broadcast alerts and MBMS real-time, or near real-time, data pertaining to law enforcement search and investigatory activities to all public safety personnel regardless of whether the user missed the initial broadcast or whether the broadband public safety device is not MBMS capable.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
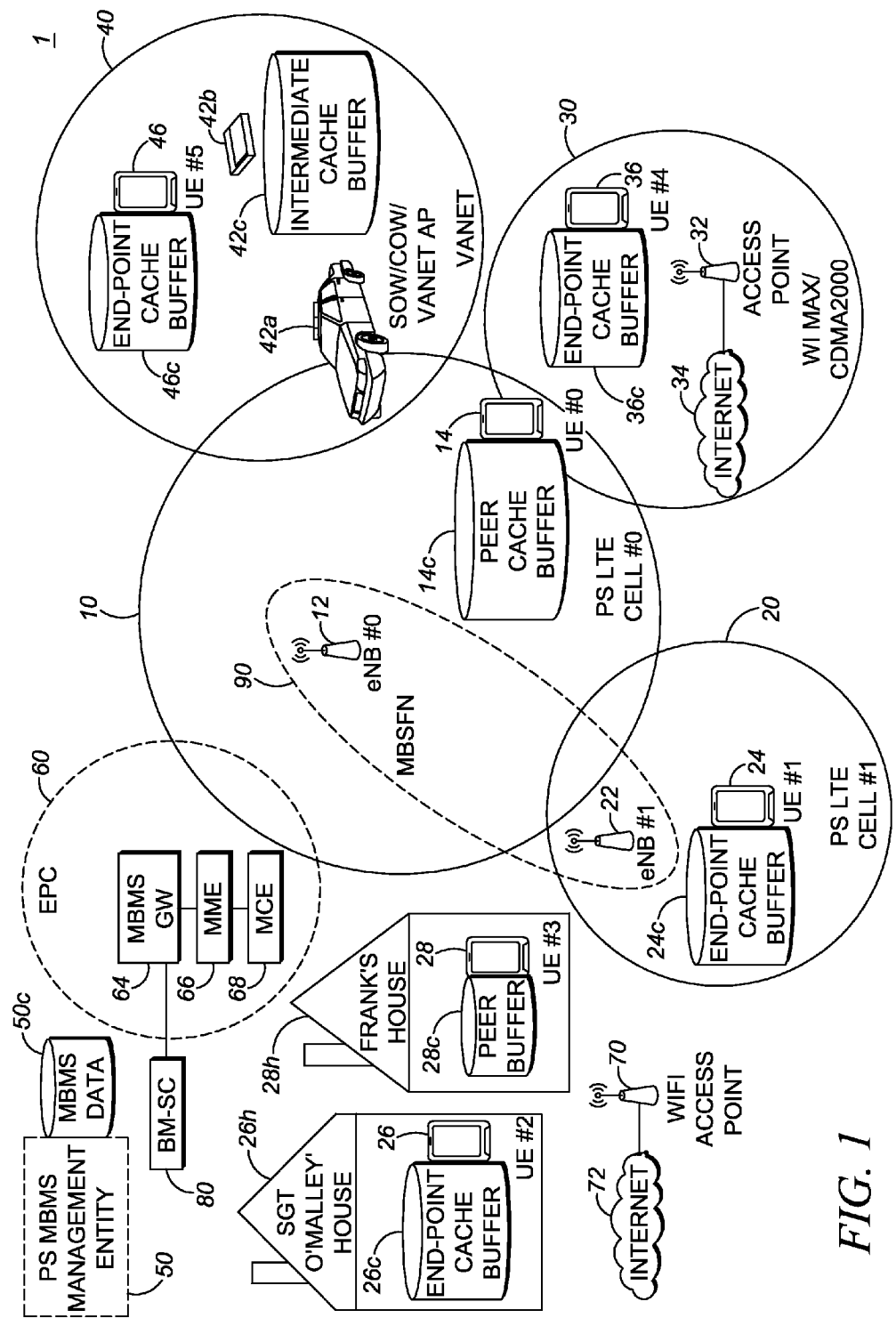
FIG. 1 is an illustration of several non-limiting example scenarios of a public safety long term evolution (PS LTE) network in accordance with some example embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the apparatus and methods described herein so as not to obscure the disclosure with details that will be readily apparent to those of ordinary skill in the art having the benefit of the description herein.

DETAILED DESCRIPTION

FIG. 1 is an illustration of several non-limiting example scenarios of a public safety long term evolution (PS LTE) network 1 in accordance with some example embodiments of the present invention. That is, as shown in FIG. 1 the PS LTE network 1 is adapted for propagating public safety (PS) multimedia broadcast/multicast services (MBMS) over one or more multimedia broadcast single frequency network (MB-SFN) areas to a plurality of public safety user equipment located with each PS LTE cell. In each of the scenarios described below (and shown in FIG. 1), the data contained in PS MBMS is further propagated by way of various distributed caches to public safety user equipment that were unable to receive the PS MBMS (e.g., the user equipment may be operating in an out of service area, or the PS user equipment may be turned off at the end of the public safety employee's shift or the user equipment is not MBMS capable). The distributed caches are located within public safety user equipment that received the original data contained in public safety MBMS and extracted that data and stored that data in each PS UE' respective cache buffers. In one example embodiment, each PS user equipment can be designated as an intermediate cache, peer cache or end point cache. Each PS UE designated as an intermediate or peer cache transmits the stored data (e.g., data contained in public safety MBMS) over one or more alternative networks to the PS UEs. In some embodiments the PS UEs are those that were unable to receive the PS MBMS directly. In other embodiments, the PS UEs may be configured to seek out connections over the alternative networks to local caches to obtain the PS MBMS data, and then, if no such local caches are available, to try to obtain the PS MBMB data over the primary network.

Example embodiments allow an operator of a PS LTE network to configure data transmissions in one of three broadcast modes: unicast, broadcast or multicast. Unicast transmissions are bidirectional point-to-point transmissions between the network and each PS UE in the network. In unicast mode the core network provides a dedicated connection to each PS UE, and the same content is transmitted multiple times (e.g., separately to each individual user equipment). Also, in broadcast mode transmissions are downlink-only point-to-multipoint connection from the core network to multiple user equipment. In broadcast mode transmissions content is transmitted once to all user equipment in a predetermined area. Some non-limiting examples of a predetermined area can be a geographical area, specific cells, sectors of a cell, or specific types of evolved Node B (eNB) (e.g., macro, femto, or pico eNBs, remote radio heads or relays). Each PS UE is free to choose whether or not to receive the MBMS. Transmissions configured for multicast mode are also downlink-only point-to-multipoint connection from the network, but are transmitted to a managed group of user equipment. Also, in multicast transmissions content is transmitted once to the whole group and only users belonging to the managed user group can receive the MBMS. As can be readily understood by those skilled in the art, the multicast or broadcast content may be transmitted more than once in order to achieve reliability of transmissions.

In FIG. 1, public safety LTE cell #0 (12) and LTE cell #1 (22) can be configured, for example, to belong to the same MBMS service area as known in the art. As such, eNB #0 (12) and eNB #1 (22) are synchronized to perform MBSFN transmissions. Accordingly, LTE cell #0 and LTE cell #1 are adapted to provide an MBSFN synchronization area 90 where each cell can participate in one or more of the 255 possible MBSFN areas designated by a public safety network operator. It should be noted that FIG. 1 shows only two PS LTE cells and two eNBs for simplicity in describing the present invention. Example embodiments may include multiple PS LTE cells populated with multiple eNBs of varying types (e.g., macro, femto, or pico eNBs, remote radio heads or relays and the like).

Also shown in FIG. 1 is a public safety MBMS management entity 50 that is adapted to issue MBMS public safety alerts and transmit MBMS real-time or near real-time data pertaining to law enforcement search and investigatory activities to public safety personnel in the PS LTE network. In one embodiment, the PS MBMS ME 50 is coupled to a broadcast/multicast service center (BM-SC) 80 adapted to provide an interface between an external content provider (such as a PS MBMS management entity 50 and the EPC 60). The BM-SC 80 is further coupled to a MBMS gateway (GW) 64, which is adapted to control signaling and traffic. In another embodiment, the PS MBMS management entity (ME) 50 functionality resides in the BM-SC 80. In yet another example embodiment of the present invention, the PS MBMS management entity (ME) 50 is located within the core network (CN) as a logical function of the evolved packet core (EPC) 60 in the non-access stratum. The MBMS GW 64, together with mobility management entities (MME) 66, is adapted to distribute session control signaling to eNB #0 (12) and eNB #1 (22). The MME 66 is further coupled to a multi-cell coordination entity (MCE) 68 which is further coupled to each eNB #0 (12) and eNB #1 (22) by way of a control plane interface.

In an alternative embodiment, the PS MBMS ME 50 is remotely located and, as such, is external to the core network and EPS. For example, the PS MBMS management entity 50 could be accessible over the Internet by way of the internet protocol (IP) multimedia subsystem (IMS) (not shown). The PS MBMS management entity 50 includes MBMS data and is adapted for distributing that MBMS data among a hierarchy of remote caches in the PS LTE network as described in more detail below.

FIG. 1 also shows several public safety user equipment (PS UE) dispersed over the PS LTE network 1. Moreover, as shown in FIG. 1, some of the PS UEs are not within the coverage area of public safety LTE cell #0 (12) and LTE cell #1 (22) but instead are accessible over alternative broadband capable networks. For example, PS LIE #0 (14) is located within the coverage area of PS LIE cell #0 (12) and, as such, can receive and store in its local cache buffer 14*c* data extracted from one or more MBMS messages from the PS MBMS ME 50 by way of eNB #0 (12). Similarly, PS UE #1 (24) is located within the coverage area of PS LTE cell #1 (22) and, as such, can receive and store in its local cache buffer 24*c* data extracted from one or more MBMS messages from the PS MBMS ME 50 by way of eNB #1 (22). That is possible because both PS UE #0 (14) and PS UE #1 (24) are participants in a MBSFN areas 90. However, if either PS UE #0 (14) or PS UE #1 (24) power down during a MBMS transmission (e.g., at the end of public safety personnel shift) they might not receive the MBMS data if they are powered back on in an area outside of the PS LTE network. PS UE #0 (14) and PS UE #1 (24) can be a laptop computer, a netbook, a tablet computer, or a device configured to communicate with a land mobile radio system (LMRS), a public land mobile radio, a private land mobile radio system, a first responders network authority (FirstNet) nationwide network (FNN), an enhanced data rates for Global System for Mobile Communication (GSM) Evolution (EDGE) Radio Access Network (GERAN), a Universal Terrestrial Radio Access Networks (UTRAN) and/or an Evolved Universal Terrestrial Radio Access (E-UTRAN) as defined by the long term evolution (LTE), LTE-advance (LTE-A) and subsequently defined in subsequent releases such as LTE-beyond (LTE-B) or a mobile satellite services (MSS) ancillary terrestrial component (ATC) network.

In one possible scenario shown in FIG. 1, public safety personnel (such as a police officer) might take the public safety user equipment to a residence, which could be located outside of the PS LTE network coverage area. As shown in FIG. 1, in accordance with this scenario PS UE #2 (26) was taken to Sergeant John O'Malley's residence 26*h* one evening at the end of his shift. As can be seen in FIG. 1, PS UE #2 (26) is located outside of the PS LTE network coverage area (e.g., outside the coverage of PS LTE cell #0 (10) or cell #1 (20)). The next morning, after powering up PS UE #2 (26) at Sargent O'Malley's residence 26*h*, the user equipment does not receive any MBMS transmission from a PS LTE network because (as mentioned earlier) O'Malley's home is not within the PS LTE network. Over the course of the evening, unbeknownst to Sergeant O'Malley, an unsolved criminal act occurred, resulting in the issuance of a be-on-the-lookout (BOLO) report. In addition, a missing person's alert was issued in an unrelated matter (e.g., an AMBER alert, CIM alert, Silver Alert or the like).

Sergeant O'Malley's neighbor is a fireman named Frank Fitzgerald, who happens to be returning to his home 28*h* from his overnight shift at the firehouse at the same time that Sargent O'Malley is leaving for work the next morning. Fireman Fitzgerald also takes home his public safety user equipment PS UE #3 (28). While fireman Frank was at work and within the coverage area of the PS LTE network, PS UE #3 (28) received a MBMS message containing the BOLO report and the missing person alert issued over the evening. The BOLO data and missing person alert message are stored in a peer cache buffer 28*c* in PS UE #3 (28).

Both Sergeant O'Malley's and fireman Frank Fitzgerald's homes (26*h* and 28*h*) have wifi access (by way of access point 70) to the Internet 72. In accordance with example embodiments of the present invention, PS UE #3 (28) is able to transmit the MBMS messages stored in peer cache buffer 28*c* (e.g., containing the BOLO data and missing person alert data) over the alternative network (i.e., the WiFi network) to PS UE #2 (26) to end-point cache buffer 26*c*. In another embodiment, both PS UE #2 (26) and PS UE #3 (28) are Bluetooth capable or Zigbee capable devices (not shown) and are adapted to form a personal area network to communicate among devices in a device-to-device communication transmitting the MBMS data. In one another embodiment, both PS UE #2 (26) and PS UE #3 (28) are WLAN mesh-enabled or peer-to-peer ad hoc networking-enabled devices (not shown) and are adapted to communicate directly among devices in a device-to-device communication transmitting the MBMS data.

In a second example scenario shown in FIG. 1, a public safety employee is outside the reception range of a PS LTE network, but within range of a worldwide interoperability for microwave access (WiMAX) network or CDMA2000 network 30 supporting evolution-data optimized or evolution-data only (EVDO). For example, PS UE #0 (14) and PS UE #4 (36) are accessible to a WiMax or EVDO access point 32. In such a scenario, a PS UE #4 (36) can obtain missed MBMS data from peer cache buffer 14*c* from PS UE #0 (14) and store the data in its local cache, end-point cache buffer 36*c*. That is, PS UE #0 (14) received the initial MBMS data from MBMS ME 50, stored the data in its cache and subsequently transmitted that data over an alternative network (WiMAX or CDMA2000) to PS UE #4 (36) end-point cache buffer 36*c* in accordance with example embodiments of the present invention.

In the third example scenario shown in FIG. 1 a public safety employee with user equipment UE #5 (46) is outside the reception range of a PS LTE network, but within range of a vehicle area network (VANET) 40. As shown in FIG. 1, according to this scenario, a police vehicle 42*a* (or other public safety vehicle such as ambulance, fire truck or the like) is equipped with a PS LTE modem 42*b*. PS LTE modem 42*b* is also a type of PS user equipment. Some non-limiting examples of a PS LTE modem are for example a Motorola VML700 LTE vehicle modem or a UM1000 LTE USM modem and the like. Alternatively, a PS LTE modem 42*b* can be integrated in a laptop computer, a netbook, a tablet computer or a device configured to communicate with a land mobile radio system (LMRS), a public land mobile radio, a private land mobile radio system, a first responders network authority (FirstNet) nationwide network (FNN), an enhanced data rates for Global System for Mobile Communication (GSM) Evolution (EDGE) Radio Access Network (GERAN), a Universal Terrestrial Radio Access Network (UTRAN) and/or an Evolved Universal Terrestrial Radio Access (E-UTRAN) as defined by the long term evolution (LTE), LTE-advance (LTE-A) and subsequently defined in subsequent releases, such as LTE-beyond (LTE-B). The PS LTE modem 42*b* also includes one or more intermediate buffer memories 42c adapted for storing one or more MBMS messages received from MBMS ME 50. VANET 40 can be enabled by an alternate wireless network such as a Wifi local area network (WLAN), a peer-to-peer ad hoc network, a mesh network, worldwide interoperability for microwave access network, a mobile satellite services (MSS) ancillary terrestrial component (ATC) network, an evolution-data optimized network, evolution-data only network, a Zigbee personal area network, a Bluetooth personal area network, a land mobile radio system, a first responders network authority nationwide network as defined by a First Responders Network Authority and a National Telecommunications and Information Administration, a global system for wireless communication network, an enhanced data rates for global system for wireless communication network, a universal terrestrial radio access network, or an evolved universal terrestrial radio access network as defined by a long term evolution (LTE), a LTE-advanced and/or LTE beyond specification including picocells, microcells and femtocells. In any of the above cases, the vehicle would be equipped with the appropriate networking equipment to support the alternative network, such as an access point or a base station or a wireless peer node. In one or more embodiments, police vehicle 42a, PS LTE modem 42b, intermediate cache buffer 42c and the networking equipment for the alternative wireless network can collectively be described as a system on wheels (SOW) or cell on wheels (COW), a VANET access point (AP) or similar first responder/disaster response deployable mobile vehicle, platform or system. In some embodiments, the networking equipment for the alternative wireless network is incorporated in the entity with the LTE modem 42b such as an access point and an LTE modem bundled into one device. In yet another embodiment (not shown), the networking equipment for the alternative wireless network exists as a separate entity in police vehicle 42a or SOW/COW vehicle, platform or system. In some embodiments (not shown), police vehicle 42a could be an air-borne entity such as a helicopter, balloon, drone and the like or a water-borne entity such as a boat, ship, submarine or a robotic entity such as those used for exploratory purposes, rescue missions and the like.

Also shown within range of VANET 40 and PS LTE modem 42b is PS UE #5 (46), which happens to be a public safety user equipment which does not support receiving MBMS data, such as, for example, a Motorola LEX 700. In this scenario, PS UE #5 (46) is adapted to receive MBMS data from intermediate cache buffer 42c by way of an alternative network (e.g., VANET 40) and storing the data in end-point cache buffer 46c in accordance with example embodiments. In this embodiment, the intermediate cache buffer 42c is populated by the MBMS transmissions received over the LTE modem 42b. In another example embodiment, both intermediate cache buffer 42c and PS UE #5 (46) communicate with each other over a land mobile radio (LMR) network or another wireless alternate network (not shown). In another embodiment (not shown), PS UE #5 (46) could be a public safety user equipment which does not support receiving MBMS data, such as, for example, a Motorola LEX 700. In such a case, even if the PS UE #5 (46) were within the reception range of MBMS transmissions over a PS LTE network, the PS UE #5 46 would be adapted to receive MBMS data from intermediate cache 42c by way of an alternative network (e.g., VANET 40). Furthermore, in some embodiments of the present invention (not shown), if a PS UE #5 (46) that does support receiving MBMS data and is within the reception range of MBMS transmissions over a PS LTE network, receives the direct MBMS transmissions with poor quality such as due to poor radio channel conditions, then this PS UE #5 46 would again be adapted to receive MBMS data from the intermediate cache buffer 42c by way of an alternative network (e.g., VANET 40).

Figure 2:
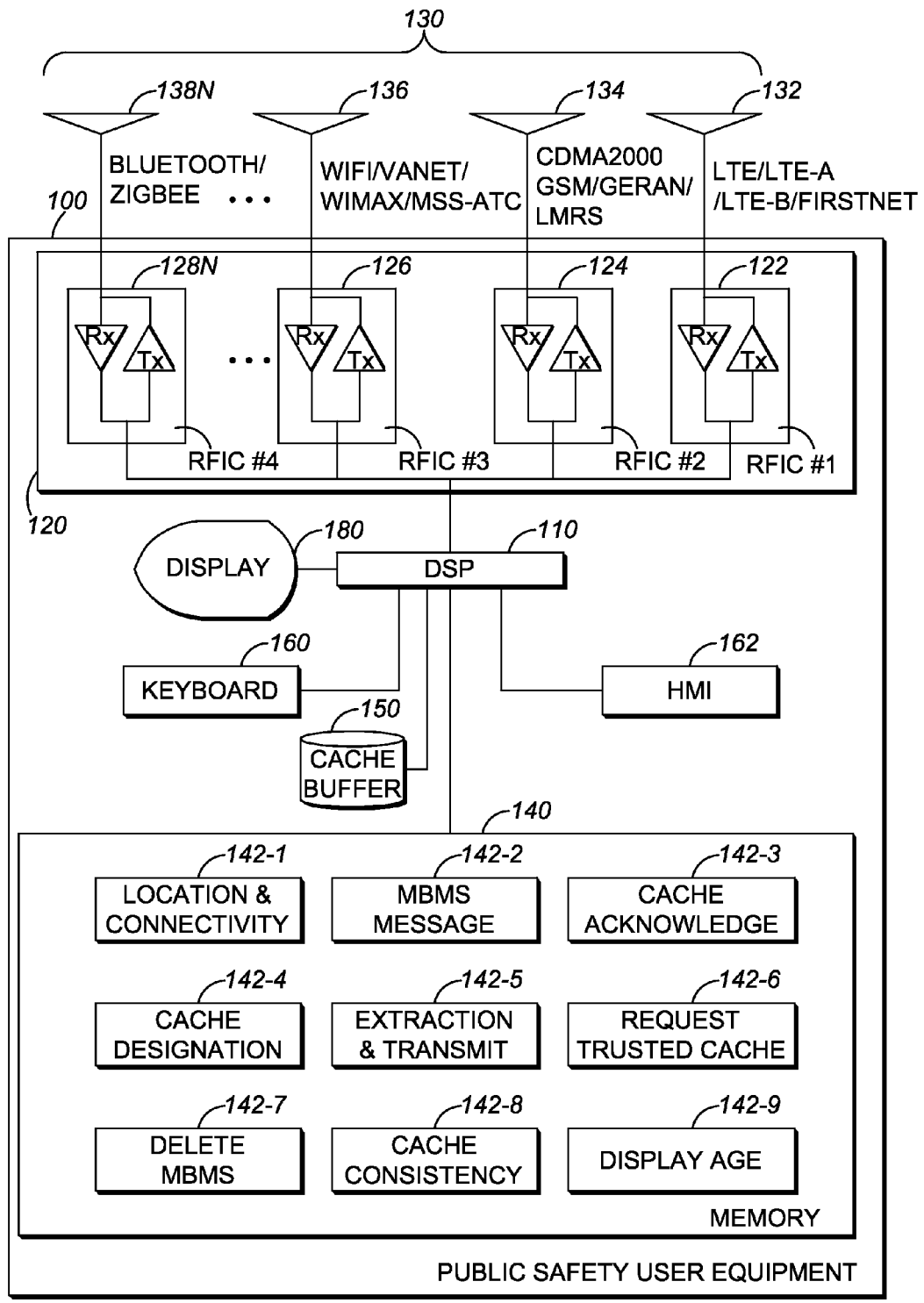
FIG. 2 is a simplified block diagram of public safety user equipment in accordance with some example embodiments.

Referring now to FIG. 2, a simplified block diagram of public safety user equipment (UE) 100 is shown in accordance with some example embodiments. PS UE 100 includes one or more processing devices, such as at least one digital signal processor (DSP) 110. DSP 110 can be a microcontroller, microprocessor or field programmable gate array or the like. Moreover, PS UE 100 includes one or more cache buffers such as local cache buffer 150. In accordance with example embodiments of the present invention, all the elements of FIG. 2 or only a subset of the elements may be present in a given embodiment. Further, the local cache buffer 150 can be characterized or designated as an intermediate cache buffer, a peer cache buffer or an end-point cache as described above in conjunction with FIG. 1 and described in more detail below.

Also included is at least one computer-readable memory 140 tangibly embodying a program of instructions executable by PS UE 100. As will be appreciated by one skilled in the art, aspects of the present disclosure may be embodied as an apparatus that incorporates some software components. Accordingly, some embodiments of the present disclosure, or portions thereof, may combine one or more hardware components such as microprocessors, microcontrollers, or digital sequential logic, etc., such as processor with one or more software components (e.g., program code, firmware, resident software, micro-code, etc.) stored in a tangible computer-readable memory device such as a tangible computer memory device, that in combination form a specifically configured apparatus that performs the functions as described herein. These combinations that form specially-programmed devices may be generally referred to herein "modules". The software component portions of the modules may be written in any computer language and may be a portion of a monolithic code base, or may be developed in more discrete code portions such as is typical in object-oriented computer languages. In addition, the modules may be distributed across a plurality of computer platforms, servers, terminals, mobile devices and the like. A given module may even be implemented such that the described functions are performed by separate processors and/or computing hardware platforms.

For example, computer-readable memory 140 stores a plurality of computer programs such as a program for periodically transmitting a location and the broadband network connectivity of PS UE 100 to one or more MBMS ME 142-1. In one example embodiment, the MBMS ME can obtain PS UE 100 location from one or more mobility management entities within the PS LTE. In another example embodiment, the broadband network connectivity information includes the type of broadband network (e.g., wifi, WiMAX, CDMA2000, VANET, Bluetooth, Zigbee and the like) and PS UE 100 IP address and other relevant connectivity information such TCP/IP network configuration values, dynamic host configuration protocol values and domain name system setting and the like required for attachment to each respective broadband network.

Another program stored in computer-readable memory 140, that when executed, creates a module for receiving one or more MBMS messages 142-2 which in one example embodiment is based upon a MBMS identification number (e.g., 0-255) with respect to one or more multimedia broadcast single frequency network areas accorded to the evolved Node B upon which PS UE 100 is camped. In one example embodiment, PS UE 100 sends a cache received acknowledgment message 142-3 back to the MBMS ME. The cache received acknowledgement message can be used by the PS UE 100 to acknowledge the receipt and caching of MBMS data. In yet another embodiment, MBMS ME can transmit a cache designation message 142-4 back to PS UE 100, assigning that device's local cache as an intermediate or peer cache buffer or an end-point cache buffer. Furthermore, in one or more embodiments, the absence of the cache designation message from the MBMS ME will cause PS UE 100 to revert to a preconfigured default behavior such as functioning as an end-point cache buffer. In yet another example embodiment the PS UE 100 will revert to a preconfigured default behavior upon the elapse of a predetermined amount of time or upon entering or entering a predetermined geographic location. Cache designation may be based on a variety of factors such as user intervention, type of alert system, type of PS UE device (example, an LTE modem in a vehicle or SOW/COW vehicle, platform or system is always designated as an intermediate cache), amount of battery life left in the PS UE device (example, a device which is low on battery life reverts back to being an end-point cache or may further revert back to not caching any data at all), relative location of the device (example, a device which is centrally located {either geographically or as a central node in a network, wherein the said node serves several other edge nodes in a network} is automatically designated as an intermediate or peer cache) etc. In another embodiment, the cache designation can be pre-configured without the aid of the MBMS ME and based on aforementioned variety of factors.

Yet another program stored in computer-readable memory 140, that when executed, creates a module 142-5 for extracting data contained in one or more MBMS messages and storing it in the cache buffer 150 for the user to consume this data as needed. Furthermore, if the cache buffer 150 is designated to be a peer or intermediate cache, 142-5 is responsible for transmitting that data to one or more proximately located user equipment upon a request from that device 142-5. That is, as described above in one or more scenarios where the proximately located PS UE missed an MBMS message due to the device operating outside the reception range of the PS LTE network or due to the fact that the proximately located UE does not have MBMS capabilities. In addition to on-demand transmission of the MBMS data or data in cache 150, some intermediate caches may be configured to periodically either broadcast or multicast over a pre-configured multicast address on the alternative network. In some embodiments, the configuration of caches to further propagate the MBMS messages on alternative network is done on-the-fly by the MBMS ME as part of the cache designation. In other embodiments, some caches may be pre-configured or manually configured to do so based on a variety of factors, such as location of the user equipment with the intermediate cache (a centrally located user equipment is more likely to reach a larger number of user equipments with such propagation), user equipment density surround the said user equipment with the intermediate cache (a larger number of target user entities can be reached by the said propagation), battery life of the user equipment with the intermediate cache (a user equipment with a reliable power source may last longer despite the battery drain due to propagation), type of public safety alert message (a high emergency situation may require a higher degree of said propagation to reach a larger audience in a timely fashion than a low priority situation) and so on. Furthermore, the periodicity of the said propagation on the alternative network and the group identifier for such messages are also configurable parameters, either of which can be configured on-the-fly by the MBMS ME or manually or set to pre-configured values.

Another program stored in computer-readable memory 140 is a program, that when executed creates a module that will cause the device to request data contained in one or more MBMS messages from a trusted intermediate or peer cache 142-6. This module assures that PS UE 100 obtains the MBMS in a scenario where the device is outside the reception range of the PS LTE network but connected to an alternative network.

Yet another program stored in computer-readable memory 140, that when executed creates a cache updating module adapted for periodically updating the MBMS data or deleting some or all of the data upon the request of the MBMS ME 142-7. In one example embodiment, a cache consistency algorithm 142-8 is periodically run on the data stored in the local cache based upon time-to-live (TTL) information accorded to that data. As such, in this embodiment, PS UE 100 will request at a predetermined time TTL an updated MBMS or data contained in the MBMS from the MBMS ME or trusted cache by way of a unicast transmission. It should be noted that although FIG. 2 discloses eight modules for use in example embodiments, some embodiments may include more or fewer modules.

Yet another module will show a message on a display 180 indicating, for example, that the data related to a missing person or a BOLO message is a certain number of hours, minutes or seconds old 142-9. In response to seeing this message, a user can input a predetermined key on a keyboard 160, or input any other command by way of human interface 162 to request an update of the missing person or BOLO alert from MBMS ME or a trusted cache. In alternate embodiments of a user equipment, such as an LTE modem, the peripherals shown here display 180, keyboard 160 or human interface 162 may be externally connected to the device.

PS UE 100 also includes, for example, at least one transceiver module 120 adapted for transmission and reception of wireless signals by way of one or more internal or external antennas, such as antenna 130. In one non-limiting example embodiment, transceiver module 120 transmits and receives signals over a long term evolution (LTE) network, or LTE-advanced (LTE-A) network, or LTE-Beyond (LTE-B) network, or on a FirstNet network on a first radio frequency module (RFIC) 122 by way of antenna 132. In another non-limiting example embodiment, transceiver module 120 transmits and receives signals over a Global System for Mobile Communication (GSM) network, or a GSM Evolution (EDGE) Radio Access Network (GERAN), or a CDMA2000 network, or a land mobile radio system (LMRS) network, or other public land mobile radio or private land mobile radio system on a second RFIC 124 over antenna 134. In another non-limiting example embodiment, a transceiver module 120 transmits and receives signals over a WiFi local area network (WILAN), or a vehicle area network (VANET), or a WiMAX network on a third RFIC 126 over antenna 136. In yet another non-limiting example embodiment, a transceiver module 120 is adapted to transmit and receive wireless signals over a Bluetooth™ personal area network or a Zigbee personal area network on a fourth RFIC 128N over antenna 138N. In another non-limiting example embodiment, a transceiver module 120 includes the means such as an additional RFIC adapted to communicate with the Global Positioning System (GPS) (not shown) for location determination. It should be noted that although FIG. 2 discloses a transceiver module 120 including four RFIC some example embodiments may optionally contain more or less RFICs as well as corresponding antennas. In some example embodiments no external antennas are employed by one or more RFICs as known by those skilled in the art.

PS UE 100 can be a cellular phone, a personal digital assistant, a wireless modem, a wireless communication device, a laptop computer, an LTE modem, a USB modem, a netbook, a tablet computer, or a device configured to communicate with a land mobile radio system (LMRS), public land mobile radio or private land mobile radio system, a first responders network authority (FirstNet) nationwide network (FNN), an enhanced data rates for Global System for Mobile Communication (GSM) Evolution (EDGE) Radio Access Network (GERAN), a Universal Terrestrial Radio Access Networks (UTRAN) and/or an Evolved Universal Terrestrial Radio Access (E-UTRAN) as defined by the long term evolution (LTE), LTE-advance (LTE-A) and as will be subsequently defined in future releases such as LTE-beyond (LTE-B).

Figure 3:
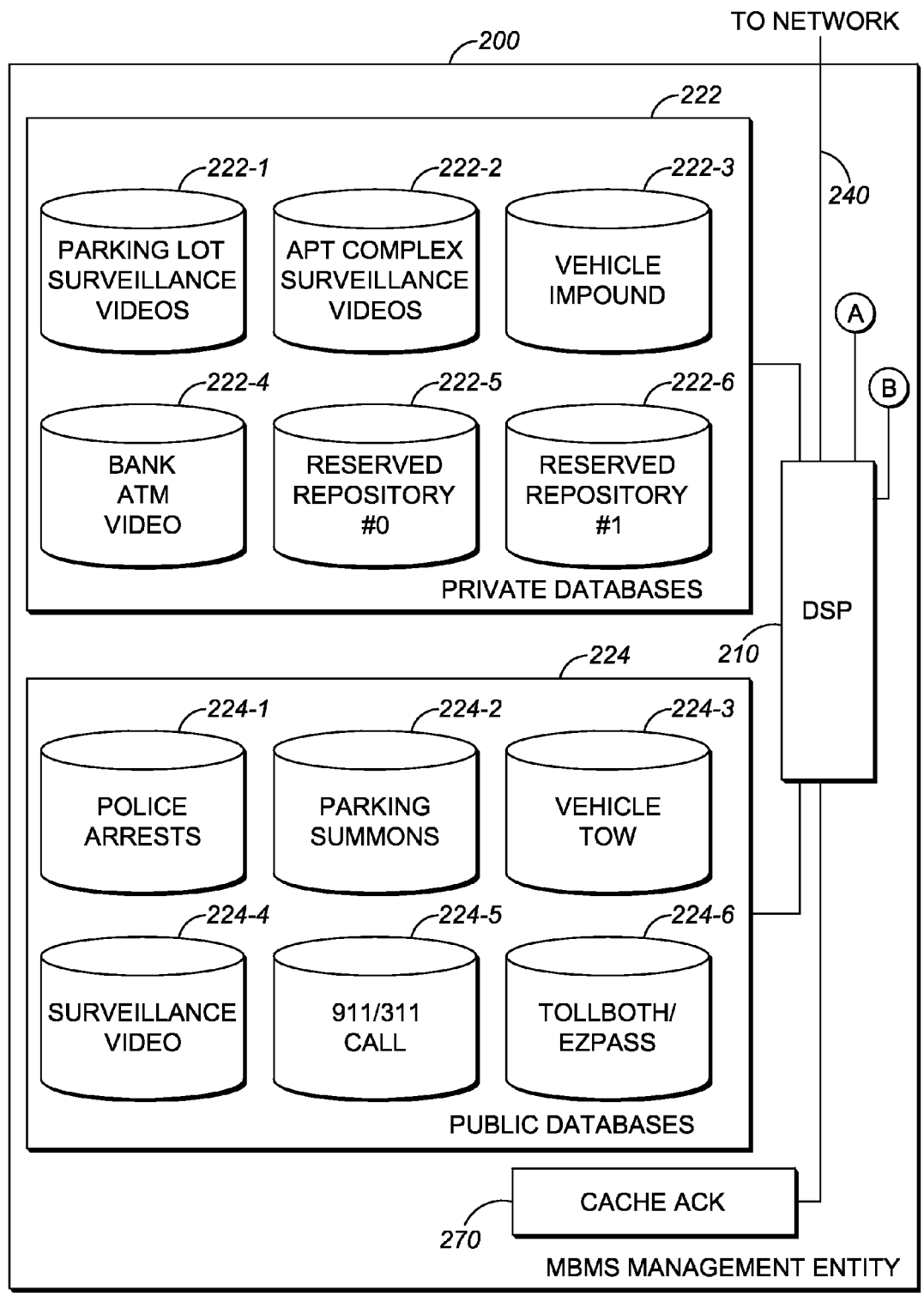
FIG. 3 is a simplified block diagram of a public safety multimedia broadcast multicast services entity in accordance with some example embodiments.
Figure 4:
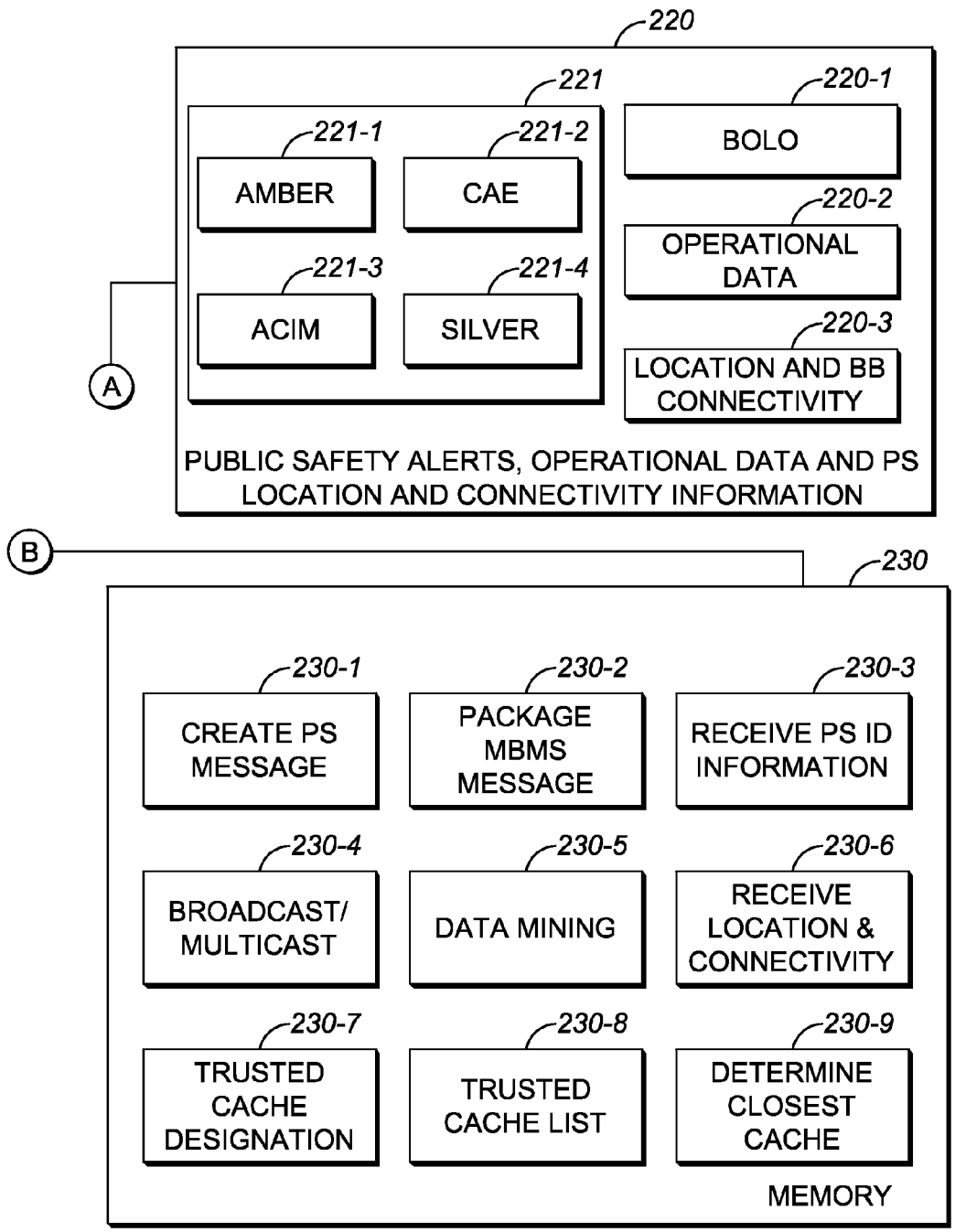
FIG. 4 is a continuation of the block diagram of FIG. 3 depicting a public safety multimedia broadcast multicast services entity in accordance with some example embodiments.

Referring now to FIGS. 3 and 4, a simplified block diagram of public safety multimedia broadcast multicast services management entity (PS MBMS ME) 200 is shown in accordance with some example embodiments. PS MBMS ME 200 includes one or more processing devices, such as at least one digital signal processor (DSP) 210. DSP 210 can be a microcontroller, microprocessor or field programmable gate array or the like.

Also included is a first computer-readable memory 220 for storing a plurality of public safety alert messages 221. In one example embodiment, the possible public safety alert messages 221 includes public safety broadcast alerts issued by a public safety network operator such as: an America's missing broadcasting emergency response (AMBER) alert 221-1, a child abduction emergency (CAE) alert 221-2, a child is missing (ACIM) alert 221-3, and/or a Silver Alert (e.g., public notification of missing seniors, typically with Alzheimer's Disease, dementia, or other mental disabilities) 221-4. Also stored in computer-readable memory 220 are data pertaining to public safety applications which provide real-time or near real-time data pertaining to various law enforcement search and investigatory activities. For example, a be-on-the-lookout (BOLO) broadcast message 220-1 containing up-to-the-minute information for all public safety personnel on various persons of interest or criminals at large. Also included in first computer memory is operational data 220-2 which could include blueprints or satellite maps particular to a geographic area providing the same operational view to all public safety personnel whether they are on opposite sides of a building, or on the other side of town, or in another county, or across state lines. Also stored in the first computer-readable memory 220 is data from various public safety user equipment pertaining to their location and broadband connectivity collected in accordance with example embodiments of the present invention. This information may include the location information such as GPS coordinates, cell identity (ID), or neighbor reports which are a list of visible neighboring networks generated by the user equipment for example, based on scanning. The connectivity information includes the various networks that the user equipment is currently connected to or may be able to access (as indicated by the neighbor reports). In an embodiment not shown in FIG. 3, the MBMS ME need not store a local copy of one or more such information (i.e., public safety alert messages, operational data, location and connectivity information), instead, it has easy access to such information that may be stored remotely.

A second computer-readable memory 222 could store a local copy of plurality of private databases, such as parking lot surveillance video data 222-1, apartment complex or housing project surveillance video data 222-2, records pertaining to vehicle impounds 222-3, various bank ATM video data 222-4, as well as other reserved private data repositories 222-5 and 222-6. Databases as defined here could incorporate structured data including text, audio, video, images etc. as well as repositories of unstructured data including text, audio, video, images etc. In an embodiment not shown in FIG. 3, the MBMS ME need not store a local copy of one or more private databases, instead, it has easy access to such databases by way of a dedicated secured wired or wireless connection to the host repositories as such data may be stored remotely.

A third computer-readable memory 224 could store a local copy of a plurality of public databases, such as police arrest records 224-1, records pertaining to parking motor vehicle summonses issued 224-2, vehicle tow records 224-3, traffic and street surveillance video, as well as predator/aerial surveillance video 224-4, 911/211/311 phone call records 224-5, and records pertaining to tollbooth and EZPASS records 224-6. Databases as defined here could incorporate structured data including text, audio, video, images etc. as well as repositories of unstructured data including text, audio, video, images etc. In an embodiment not shown in FIG. 3, the MBMS ME need not store a local copy of one or more private databases, instead, it has easy access to such databases by way of a dedicated secured wired or wireless connection to the host repositories as such data may be stored remotely.

A fourth computer-readable memory 230 contains one or more computer programs tangibly embodying a program of instructions executable by PS ME 200. For example, the fourth computer-readable memory 230 stores a plurality of computer programs, that when executed create modules, such as a module for creating at least one public safety alert or operational data upon a request from a public safety operator 230-1, a module for packaging the public safety alert or operational data in a multimedia broadcast or multicast message 230-2, a module for receiving identification information of a plurality of public safety user equipment in a first wireless communication network 230-3, a module for broadcasting or multicasting multimedia broadcast or multicast message to the plurality of public safety user equipment over the first wireless communication network 230-4, and a module for periodically receiving updated multimedia data such as text, video, images, graphics, location coordinates, audio clips etc, pertaining to the public safety alert, or operational data, and mining that data to determine if the multimedia broadcast or multicast message requires updating 230-5. In one example embodiment the data mining operation includes a video analysis function and a correlation function that utilize various statistical methods and video recognition algorithms known in the art. In one non-limiting illustrative example, a BOLO alert for a known vehicle may be updated with location information if the relevant vehicle is seen on a surveillance video of a private parking lot, as identified by its license plate and type and color of vehicle. In this example, the correlation between the existing Public Safety alert message & the surveillance video could be accomplished using known video analytics techniques. In one example embodiment, the correlation between an existing public safety alert messages & various databases & repositories could be done by a correlation engine functionality within the data mining module that is centralized as shown in 230-5. In an alternate example embodiment, this correlation engine functionality could be distributed. In particular, each subset of the correlation engine would be responsible for correlating the announcement with a smaller subset of databases & repositories. In yet another embodiment, the data mining and correlation function 230-5 may be remotely located.

Other possible programs stored in a fourth computer-readable memory 230, that when executed for a module, are: a program for receiving user equipment location data and broadband connectivity data over the first wireless network 230-6, a program for transmitting to the user equipment a local cache identifier designating each user equipment an intermediate cache destination, a peer cache designation or an end point cache designation 230-7, wherein an intermediate cache designation or peer cache designation requires that the user equipment respond to a public safety alert or operation data request from a user equipment over an alternative network and transmit relevant data stored its respective intermediate cache or peer cache, whereas an end-point cache is used for content-consumption only at the user equipment without any provisions for transmitting the data stored in the end-point cache. The peer cache is also available for local content consumption at the user equipment with provisions for transmitting the data stored in the peer cache. Cache designation may be based on a variety of factors such as user intervention, type of alert system, type of PS UE device (example, an LTE modem in a vehicle is always designated as an intermediate cache), amount of battery life left in the PS UE device (example, a device which is low on battery life reverts back to being an end-point cache), relative location of the device (example, a device which is centrally located is automatically designated as an intermediate or peer cache) etc. Furthermore, the cache designation module 230-7 may also select certain intermediate caches to further propagate the MBMS messages on alternative networks periodically. In some embodiments, the cache designation module 230-7 will additionally provide at least one of the cache propagation periodicity and the group identifier for propagation messages on the alternative networks. Another possible programs stored in 230, that when executed for a module, is a program for creating, or compiling, a trusted cache list containing a list of all intermediate cache designated user equipment and all peer cache designated PS user equipment) and periodically broadcasting the trusted cache list to the plurality of public safety user equipment. Yet another program stored in the fourth computer-readable memory 230 is a program for determining a closest trusted peer cache or a trusted intermediate cache among the public safety user equipment on an alternative broadband network 230-9. The determination of the closest trusted peer or intermediate caches may be based on many factors such as the location and connectivity information 220-3 of the user equipments with the peer cache & intermediate cache as well as the target user equipment (i.e., the user equipment or which the information regarding the closest intermediate or peer cache is being sought.). In an embodiment not shown in FIG. 3, one or more functionality in 230 may be distributed over multiple nodes. It should be noted that one or more example embodiments described herein may include one or more of the modules shown in fourth computer-readable memory 230.

PS MBMS ME 200 also includes a network interface 240 adapted for communicating with an evolved packet system (EPS) in a long term evolution network. In one example embodiment, PS MBMS ME 200 is coupled to a broadcast/multicast service center (BM-SC) adapted to provide an interface with an external content provider (such as direct connections to private and public data bases). In another embodiment, the PS MBMS ME200 functionality resides in the BM-SC. In yet another example embodiment of the present invention, the PS MBMS ME is located within the core network (CN).

Figure 5:
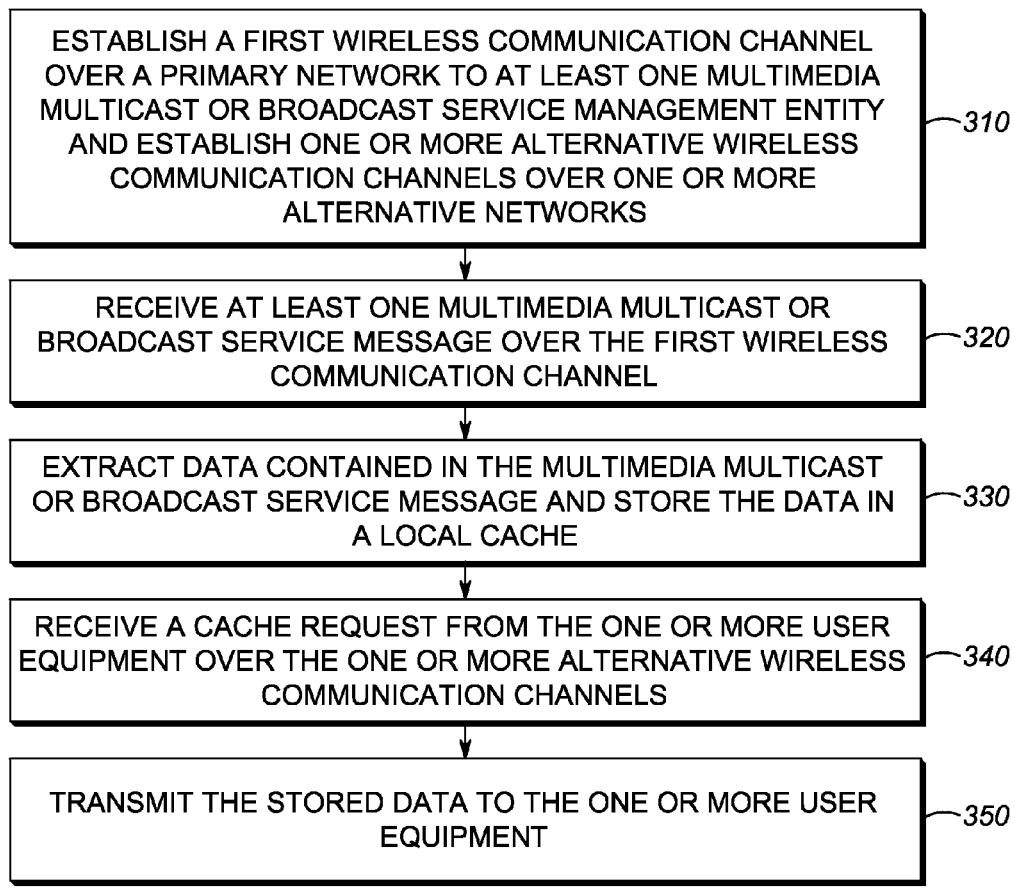
FIG. 5 is a logical flow diagram that illustrates and describes a method of propagating a multimedia broadcast multicast services message among public safety user equipment in accordance with example embodiments of the present invention.

Referring now to FTC. 5, a logical flow diagram 300 is shown which illustrates and describes a method of propagating a multimedia broadcast multicast services message among public safety user equipment in accordance with example embodiments. As shown in FIG. 5, a public safety user equipment establishes a first wireless communication channel over a primary network to at least one multimedia multicast or broadcast service management entity and establishes one or more alternative wireless communication channels over one or more alternative networks (310). In one example embodiment, the public safety user equipment establishes one or more alternative wireless communication channels with one or more access points over one or more alternative networks. In one example embodiment the access point is proximately located to one or more public safety user equipment not connected to the first wireless communication channel. In another example embodiment, the public safety user equipment establishes a peer-to-peer connection with a proximately-located public safety user equipment over a peer-to-peer alternative ad hoc network or personal area network. In one example embodiment the proximately-located public safety user equipment is not connected to the first wireless communication channel. In some examples, the functionality of an access point could be collocated with the said user equipment which has the first wireless connection to one multimedia multicast or broadcast service management entity. Subsequently, example embodiments of the method and computer programs described herein provide that the public safety user equipment receive at least one multimedia multicast or broadcast service message over the first wireless communication channel (320). Then, the PS UE extracts data contained in the multimedia multicast or broadcast service message and stores the data in a local cache (330). Next, the PS UE receives a cache request from the one or more user equipment over the one or more alternative wireless communication channels (340), and then transmits the stored data to the one or more user equipment (350).

Some example embodiments also provide that the PS UE transmits a cache received acknowledgment message to the multimedia multicast or broadcast service management entity. Another example embodiment also provides that the PS UE: periodically transmit a location data and broadband network connectivity data to the at least one multimedia multicast or broadcast service management entity, receive a cache designation message assigning the local cache as an intermediate cache or a peer cache, or end point cache, and periodically transmit a cache updated message to the at least one multimedia multicast or broadcast service management entity, indicating the identity of each user equipment receiving the data in the local cache and the location data and broadband network connectivity data pertaining to each user equipment.

Yet another example embodiment provides that the PS UE periodically receive one or more updated multimedia multicast or broadcast service message over the first wireless communication channel, or in response to a user input requesting the updated multimedia multicast or broadcast service message.

Some example embodiments also provide that the PS UE receive instructions to delete some or all of the data in the local cache from a multimedia multicast or broadcast service management entity. Yet another example embodiment of the present invention provides that the PS UE periodically run a cache consistency check on the local cache to determine the time-to-live of the data stored in the local cache and display the age of the data stored in the local cache on a display screen and in response to determining a predetermined time-to-live requesting an updated multimedia multicast or broadcast service message.

In one embodiment, a PS UE may request the system to identify a local cache from which it may receive current MBMS data. The UE may transmit a cache request message to an entity, such as the MBMS management entity. The cache location request message may contain the location coordinates from a GPS device in the UE, or the location may be determined from other parameters associated with the UE, such as a cell/sector identifier, or the location may be determined by triangulation by cell cites such as the eNode Bs of an LTE system, or the relative location may be determined based on neighbor reports of the user equipment, which in turn, could be populated by scanning, for example. The MBMS management entity may receive the request from the UE, and, using whatever form of location information is available, may query its databases to identify any cache entities that may be in the vicinity of the requesting UE. The management entity may then respond by transmitting a cache identification message addressed to the requesting UE. The cache identification message may include a cache identifier of the closest local cache for the UE. The cache identification message may also include connection details regarding the alternative networks by which the local cache entity is reachable. This may include a WiFi SSID and security parameters, such as a security protocol type and network password, or other such parameters as appropriate for the alternative network type.

Yet another example embodiment provides that the primary network is to be selected from the group consisting of: a land mobile radio system, a first responders network authority nationwide network, a global system for wireless communication network, an enhanced data rates for global system for wireless communication network, a universal terrestrial radio access network and an evolved universal terrestrial radio access network as defined by a long term evolution (LTE), a LTE-advanced and/or LTE beyond specification or a mobile satellite services (MSS) ancillary terrestrial component (ATC) network.

Figure 6:
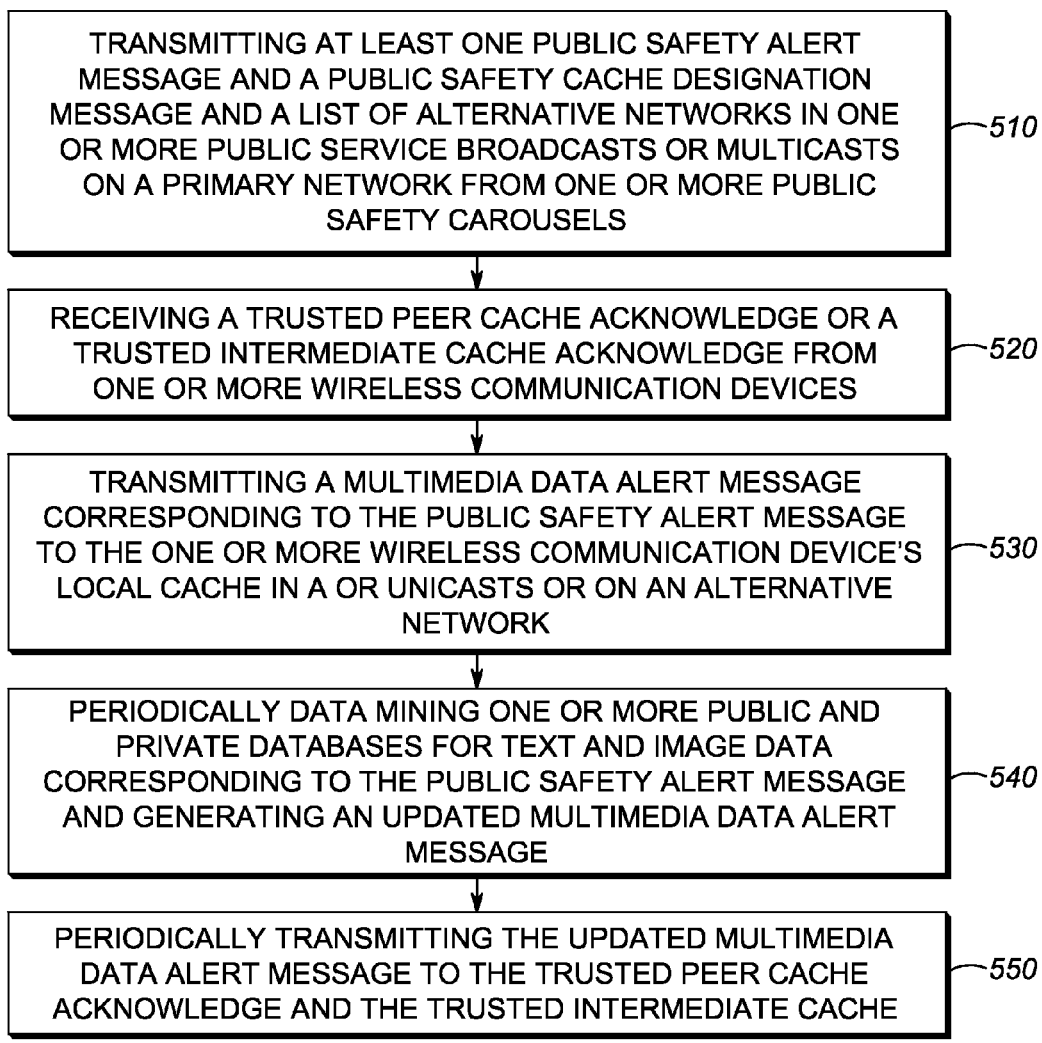
FIG. 6 is a logic flow diagram that illustrates and describes a method of operation of a public safety multimedia broadcast multicast services entity in accordance with example embodiments of the present invention.

In addition, some example embodiments also provide that the one or more alternative networks are selected from the group consisting of a WiFi local area network, a peer-to-peer ad hoc network, a worldwide interoperability for microwave access network, an evolution-data optimized network, evolution-data only network, a Zigbee personal area network, a Bluetooth personal area network, a land mobile radio system, a first responders network authority nationwide network, a global system for wireless communication network, an enhanced data rates for global system for wireless communication network, a universal terrestrial radio access network and an evolved universal terrestrial radio access network as defined by a long term evolution (LTE), a LTE-advanced and/or LTE beyond specification or a mobile satellite services (MSS) ancillary terrestrial component (ATC) network, Referring low to FIG. 6, a logical flow diagram 500 is shown that illustrates and describes a public safety multimedia broadcast multicast services entity (PS MBMS ME) in accordance with example embodiments. As shown in FIG. 6, PS MBMS ME creates at least one public safety alert or operational data upon a request from a public safety operator (510). Then, PS MBMS ME packages the public safety alert or operational data in a multimedia broadcast or multicast message (520). Next, PS MBMS ME receives identification information such as a group identification or a multicast or broadcast address for a plurality of public safety user equipment in a first wireless communication network (530). Thereafter, PS MBMS ME broadcasts or multicasts a multimedia broadcast or multicast message to the plurality of public safety user equipment over the first wireless communication network (540) and periodically receives updated multimedia data pertaining to the public safety alert or operational data and mines that data to determine if the multimedia broadcast or multicast message requires updating (550).

In some example embodiments, PS MBMS ME receives user equipment location data and broadband connectivity data over the first wireless network, transmits to the user equipment a local cache identifier designating each user equipment an intermediate cache destination, a peer cache designation or an end point cache designation, compiles or creates a trusted cache list containing a list of all intermediate cache designated user equipment and all peer cache designation user equipment and periodically either broadcasts or multicasts or unicasts the trusted cache list to the plurality of public safety user equipment, wherein an intermediate cache designation or peer cache designation requires that the user equipment respond to a public safety alert or operation data request from a user equipment over an alternative network and transmit relevant data stored in its respective intermediate cache or peer cache. In one embodiment, the PS MBMS ME may also transmit the trusted cache list on-demand at receiving a request from a user equipment.

In some example embodiments, a public safety multimedia broadcast multicast services management entity determines the closest trusted peer cache, or a trusted intermediate cache among the user equipment on an alternative broadband network.

In yet another example embodiment, the public safety alert comprises multimedia data selected from a group consisting of: (i) a child abduction emergency alert, (ii) a child is missing alert message, (iii) an America's missing broadcasting emergency response message and (iv) a silver alert message.

In yet another example embodiment, the operational data comprises multimedia data pertaining to a be-on-the-lookout message.

In yet another example embodiment, the updated multimedia data pertaining to the public safety alert or one or more operational data are received from one or more public or private databases comprising image or textual data or other multimedia data selected from the group consisting of: (i) a plurality of public databases, including one or more police arrest records, one or more parking summonses, one or more vehicle tow records, one or more highway and street surveillance videos, one or more 911 and 311 call transcripts, and one or more toll booth and EZPass transaction records and (ii) a plurality of private databases, including one or more parking lot surveillance videos, one or more apartment complex surveillance records, one or more vehicle tow records, one or more automatic teller surveillance videos, a first private records repository, and a second private records repository.

In some example embodiments, an updated multimedia data alert message is generated, and further comprises analyzing and correlating one or more videos in the one or more public or private databases with image data in the multimedia data alert message and analyzing and correlating one or more textual documents in the one or more public or private databases with text data in the multimedia data alert message. As an example, an updated arrest record in county A with arrest of person-of-interest, John Doe can result in cancellation of a BOLO alert for John Doe in county B.

In yet another example embodiment, the alternative network is a wifi local area network, a peer-to-peer ad hoc network, a mesh network, worldwide interoperability for microwave access network, an evolution-data optimized network, evolution-data only network, a Zigbee personal area network, a Bluetooth personal area network, a land mobile radio system, a first responders network authority nationwide network as defined by a First Responders Network Authority and a National Telecommunications and information Administration, a global system for wireless communication network, an enhanced data rates for global system for wireless communication network, a universal terrestrial radio access network, or an evolved universal terrestrial radio access network as defined by a long term evolution (LTE), a LTE-advanced and/or LTE beyond specification or a mobile satellite services (MSS) ancillary terrestrial component (ATC) network.

In one embodiment, the method comprises: establishing a first wireless communication channel over a primary network to at least one multimedia multicast or broadcast service management entity and establishing one or more alternative wireless communication channels over one or more alternative networks; receiving at least one multimedia multicast or broadcast service message over the first wireless communication channel; extracting data contained in the multimedia multicast or broadcast service message and storing the data in a local cache; receiving a cache request from one or more user equipment over the one or more alternative wireless communication channels; and transmitting the stored data to the one or more user equipment. The method may further comprise: transmitting a cache received acknowledgment message to the multimedia multicast or broadcast service management entity. In further embodiments, the method may include periodically transmitting a location data and a broadband network connectivity data to the at least one multimedia multicast or broadcast service management entity, and receiving a cache designation message assigning the local cache as an intermediate cache or a peer cache, or end point cache; and periodically transmitting a cache updated message to the at least one multimedia multicast or broadcast service management entity indicating an identity of each user equipment receiving the data in the local cache and the location data and broadband network connectivity data pertaining to each user equipment. Still further embodiments may further comprise: receiving one or more updated multimedia multicast or broadcast service message over the first wireless communication channel, wherein the updated multimedia multicast or broadcast service messages are received periodically and/or in response to a user input requesting the updated multimedia multicast or broadcast service message. The method may further comprise: receiving instructions to delete some or all of the data in the local cache from a multimedia multicast or broadcast service management entity, and/or periodically running a cache consistency check on the local cache to determine a time-to-live of the data stored in the local cache; and displaying the age of the data stored in the local cache on a display screen; and in response to determining a predetermined time-to-live requesting an updated multimedia multicast or broadcast service message.

The primary network is selected from the group consisting of a land mobile radio system, a first responders network authority nationwide network, a global system for wireless communication network, an enhanced data rates for global system for wireless communication network, a universal terrestrial radio access network and an evolved universal terrestrial radio access network as defined by a long term evolution (LTE), a LTE-advanced and/or LIE beyond specification, and the one or more alternative networks are from the group consisting of a wifi local area network, a worldwide interoperability for microwave access network, an evolution-data optimized network, evolution-data only network, a Zigbee personal area network, a Bluetooth personal area network, a land mobile radio system, a first responders network authority nationwide network, a global system for wireless communication network, an enhanced data rates for global system for wireless communication network, a universal terrestrial radio access network and an evolved universal terrestrial radio access network as defined by a long term evolution (LTE), a LTE-advanced and/or LTE-beyond specification or a mobile satellite services (MSS) ancillary terrestrial component (ATC) network.

Some embodiments in the form of an apparatus may comprise: at least one processor; and at least one tangible memory device having stored thereon computer instructions that when executed, cause the apparatus to: establish a first wireless communication channel over a primary network to at least one multimedia multicast or broadcast service management entity and establish one or more alternative wireless communication channels with one or more access points over one or more alternative networks or as a peer in a peer-to-peer alternative ad hoc network; receive at least one multimedia multicast or broadcast service message over the first wireless communication channel; extract data contained in the multimedia multicast or broadcast service message and storing the data in a local cache; receive a cache request from the one or more user equipment one or more alternative wireless communication channels; and transmit the stored data to the one or more user equipment. The processor may also cause the apparatus to further transmit a cache received acknowledgment message to the multimedia multicast or broadcast service management entity. In further embodiments, the processor may periodically transmit a location data and a broadband network connectivity data to the at least one multimedia multicast or broadcast service management entity; receive a cache designation message assigning the local cache as an intermediate cache or a peer cache, or end point cache; and periodically transmit a cache updated message to the at least one multimedia multicast or broadcast service management entity indicating an identity of each user equipment receiving the data in the local cache and the location data and broadband network connectivity data pertaining to each user equipment. In addition, the processor may receive one or more updated multimedia multicast or broadcast service message over the first wireless communication channel, and may also receive instructions to delete some or all of the data in the local cache from a multimedia multicast or broadcast service management entity. Further embodiments include periodically running a cache consistency check on the local cache to determine a time-to-live of the data stored in the local cache; and display the age of the data stored in the local cache on a display screen; and in response to determining a predetermined time-to-live, request an updated multimedia multicast or broadcast service message.

Still further embodiments include a program storage device readable by a machine, tangibly embodying a program of instructions executable by the machine for causing performance of operations, said operations comprising: establishing a first wireless communication channel over a primary network to at least one multimedia multicast or broadcast service management entity and establishing one or more alternative wireless communication channels with alternative networks. In one example embodiment, the public safety user equipment establishes one or more alternative wireless communication channels with one or more access points over one or more alternative networks. In one example embodiment the access point is proximately located to one or more public safety user equipment not connected to the first wireless communication channel. In another alternative embodiment, the public safety user equipment establishes a peer-to-peer alternative ad hoc network or a personal area network; receiving at least one multimedia multicast or broadcast service message over the first wireless communication channel; extracting data contained in the multimedia multicast or broadcast service message and storing the data in a local cache; receiving a cache request from the one or more user equipment over one or more alternative wireless communication channels; and transmitting the stored data to the one or more user equipment. Further aspects of the instruction may include transmitting a cache received acknowledgment message to the multimedia multicast or broadcast service management entity. A further aspect may include periodically transmitting a location data and a broadband network connectivity data to the at least one multimedia multicast or broadcast service management entity; receiving a cache designation message assigning the local cache as an intermediate cache or a peer cache, or end point cache; and periodically transmitting a cache updated message to the at least one multimedia multicast or broadcast service management entity indicating an identity of each user equipment receiving the data in the local cache and the location data and broadband network connectivity data pertaining to each user equipment. Further stored instructions may include receiving one or more updated multimedia multicast or broadcast service message over the first wireless communication channel and/or receiving instructions to delete some or all of the data in the local cache from a multimedia multicast or broadcast service management entity, and/or periodically running a cache consistency check on the local cache to determine a time-to-live of the data stored in the local cache, and displaying the age of the data stored in the local cache on a display screen, and in response to determining a predetermined time-to-live requesting an updated multimedia multicast or broadcast service message.

An additional embedment is a method comprising: creating at least one public safety alert or operational data upon a request from a public safety operator; packaging the public safety alert or operational data in a multimedia broadcast or multicast message; receiving identification information of a plurality of public safety user equipment in a first wireless communication network; broadcasting or multicasting a multimedia broadcast or multicast message to the plurality of public safety user equipment over the first wireless communication network; and periodically receiving updated multimedia data pertaining to the public safety alert or operational data and mining that data to determine if the multimedia broadcast or multicast message requires updating. The method may also comprise: receiving user equipment location data and broadband connectivity data at over the first wireless network; transmitting to the user equipment a local cache identifier designating each user equipment an intermediate cache destination, a peer cache designation or an end point cache designation; compiling a trusted cache list containing a list of all intermediate cache designated user equipment and all peer cache designation user equipment and periodically broadcasting the trusted cache list to the plurality of public safety user equipment, wherein an intermediate cache designation or peer cache designation requires that the user equipment respond to a public safety alert or operation data request from a user equipment over an alternative network and transmit relevant data stored its respective intermediate cache or peer cache. A public safety multimedia broadcast multicast services management entity may also determine a closest trusted peer cache or a trusted intermediate cache among the user equipment on an alternative broadband network.

In further embodiments, an updated multimedia data alert message may be generated by analyzing and correlating one or more videos in the one or more public or private databases with image data in the multimedia data alert message; and analyzing and correlating one or more textual documents in the one or more public or private databases with text data in the multimedia data alert message. The update to the alert message could either be addition of data (such as an image of the suspect's companion as seen in the surveillance video of a parking lot), deletion of data (such as removal of the vehicle information from the alert if the vehicle is located, say, abandoned in a parking lot) or modification of data (such as an image of the suspect & the companion seen driving a new car through a toll plaza) to the alert message. The data mining and the correlation function may reside in the PS MBMS ME in some embodiments or outside of the PS MBMS ME with the PS MBMS ME having access to the analyses and correlation results in other embodiments.

A further embodiment in the form of an apparatus comprises: at least one processor; and at least one tangible memory device having stored thereon computer instructions that when executed, cause the apparatus to: create at least one public safety alert or operational data upon a request from a public safety operator; package the public safety alert or operational data in a multimedia broadcast or multicast message; receive identification information of a plurality of public safety user equipment in a first wireless communication network; broadcast or multicast a multimedia broadcast or multicast message to the plurality of public safety user equipment over the first wireless communication network; and periodically receive updated multimedia data pertaining to the public safety alert or operational data and mine that data to determine if the multimedia broadcast or multicast message requires updating. The apparatus may also receive user equipment location data and broadband connectivity data over the first wireless network; transmit to the user equipment a local cache identifier designating each user equipment an intermediate cache destination, a peer cache designation or an end point cache designation; compile a trusted cache list containing a list of all intermediate cache designated user equipment and all peer cache designation user equipment and periodically broadcast the trusted cache list to the plurality of public safety user equipment, wherein an intermediate cache designation or peer cache designation requires that the user equipment respond to a public safety alert or operation data request from a user equipment over an alternative network and transmit relevant data stored its respective intermediate cache or peer cache. The apparatus determine a closest trusted peer cache or a trusted intermediate cache among the user equipment on an alternative broadband network.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having,"

"includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
creating at least one public safety alert or operational data in response to a request from a public safety operator;
packaging the at least one public safety alert or operational data in a multimedia broadcast or multicast message;
receiving identification information of a plurality of public safety user equipment in a first wireless communication network;
receiving user equipment location data and broadband connectivity data over the first wireless network;
transmitting to the plurality of public safety user equipment a local cache identifier designating each of the plurality of public safety user equipment an intermediate cache designation, a peer cache designation or an end point cache designation;
compiling a trusted cache list containing a list of all intermediate cache designated public safety user equipment and all peer cache designated public safety user equipment and periodically broadcasting the trusted cache list to the plurality of public safety user equipment, wherein an intermediate cache designation or peer cache designation requires that the designated public safety user equipment respond to a public safety alert or operation data request from one of the plurality of public safety user equipment over an alternative network and transmit relevant data stored in the designated public safety user equipment's respective intermediate cache or peer cache;
broadcasting or multicasting the multimedia broadcast or multicast message to the plurality of public safety user equipment over the first wireless communication network; and
periodically receiving updated multimedia data pertaining to the at least one public safety alert or operational data and mining the updated multimedia data to determine if the multimedia broadcast or multicast message requires updating.

2. The method of claim 1, wherein a public safety multimedia broadcast multicast services management entity determines a closest trusted peer cache or a trusted intermediate cache among the user equipment on an alternative broadband network.

3. The method of claim 1, wherein the at least one public safety alert comprises multimedia data selected from a group consisting of:
a child abduction emergency alert;
a child is missing alert message;
an America's missing broadcasting emergency response message; and
a silver alert message wherein the operational data comprises multimedia data pertaining to a be-on-the-lookout message.

4. The method of claim 1, wherein the updated multimedia data pertaining to the at least one public safety alert or operational data are received from one or more public databases comprise image or textual data selected from the group consisting of:
a plurality of public databases including one or more police arrest records, one or more parking summons, one or more vehicle tow records, one or more highway and street surveillance videos, one or more 911 and 311 call transcripts, and one or more toll booth and EZPass transaction records; and a plurality of private databases including one or more parking lot surveillance videos, one or more apartment complex surveillance records, one or more vehicle tow records, one or more automatic teller surveillance videos, a first private records repository, and a second private records repository.

5. The method of claim 1, further comprising:

determining that the multimedia broadcast or multicast message requires updating; and in response to determining that the multimedia broadcast or multicast message requires updating, generating an updated multimedia data alert message.

6. The method of claim 5, wherein determining that the multimedia broadcast or multicast message requires updating comprises:

analyzing and correlating one or more videos in the one or more public or private databases with image data in the multimedia data alert message; or analyzing and correlating one or more textual documents in the one or more public or private databases with text data in the multimedia data alert message.

7. The method of claim 1, further comprising:

receiving a cache location request message from a user equipment; and, transmitting a cache identification message to the user equipment, the cache identification message including an alternative network identifier and a cache identifier.

8. An apparatus, comprising:

at least one processor; and at least one tangible memory device having stored thereon computer instructions that when executed by the processor, cause the apparatus to:

create at least one public safety alert or operational data in response to a request from a public safety operator;

package the at least one public safety alert or operational data in a multimedia broadcast or multicast message;

receive identification information of a plurality of public safety user equipment in a first wireless communication network;

receive user equipment location data and broadband connectivity data over the first wireless network;

transmit to the plurality of public safety user equipment a local cache identifier designating each of the plurality of public safety user equipment an intermediate cache designation, a peer cache designation or an end point cache designation;

compile a trusted cache list containing a list of all intermediate cache designated public safety user equipment and all peer cache designated public safety user equipment and periodically broadcast the trusted cache list to the plurality of public safety user equipment, an intermediate cache designation or peer cache designation requires that the designated public safety user equipment respond to a public safety alert or operation data request from one of the plurality of public safety user equipment over an alternative network and transmit relevant data stored in the designated public safety user equipment's respective intermediate cache or peer cache;

broadcast or multicast the multimedia broadcast or multicast message to the plurality of public safety user equipment over the first wireless communication network; and periodically receive updated multimedia data pertaining to the at least one public safety alert or operational data and mining the updated multimedia data to determine if the multimedia broadcast or multicast message requires updating.

9. The apparatus of claim 8, further comprising a public safety multimedia broadcast multicast services management entity that is configured to determine a closest trusted peer cache or a trusted intermediate cache among the user equipment on an alternative broadband network.

10. The apparatus of claim 8, wherein the at least one public safety alert comprises multimedia data selected from a group consisting of:

a child abduction emergency alert;

a child is missing alert message;

an America's missing broadcasting emergency response message; and a silver alert message wherein the operational data comprises multimedia data pertaining to a be-on-the-lookout message.

11. The apparatus of claim 8, wherein the updated multimedia data pertaining to the at least one public safety alert or operational data are received from one or more public databases comprise image or textual data selected from the group consisting of:

a plurality of public databases including one or more police arrest records, one or more parking summons, one or more vehicle tow records, one or more highway and street surveillance videos, one or more 911 and 3 ii call transcripts, and one or more toll booth and EZPass transaction records; and a plurality of private databases including one or more parking lot surveillance videos, one or more apartment complex surveillance records, one or more vehicle tow records, one or more automatic teller surveillance videos, a first private records repository, and a second private records repository.

12. The apparatus of claim 8, wherein the at least one processor, and at least one tangible memory storing computer instructions that when executed, cause the apparatus to further:

determine that the multimedia broadcast or multicast message requires updating; and in response to determining that the multimedia broadcast or multicast message requires updating, generate an updated multimedia data alert message.

13. The apparatus of claim 12, wherein the at least one processor, and at least one tangible memory storing computer instructions that when executed; cause the apparatus to determine that the multimedia broadcast or multicast message requires updating by:

analyzing and correlating one or more videos in the one or more public or private databases with image data in the multimedia data alert message; or analyzing and correlating one or more textual documents in the one or more public or private databases with text data in the multimedia data alert message.

14. The apparatus of claim 8, wherein the at least one processor, and at least one tangible memory storing computer instructions that when executed, cause the apparatus to:

receive a cache location request message from a user equipment; and, transmit a cache identification message to the user equipment, the cache identification message including an alternative network identifier and a cache identifier.

* * * * *